United States Patent [19]

Agari

[11] Patent Number: 5,213,420
[45] Date of Patent: May 25, 1993

[54] LINEAR MOTION ROLLING CONTACT GUIDE UNIT HAVING AN INCREASED FREEDOM IN MOUNTING

[75] Inventor: Norimasa Agari, Seki, Japan
[73] Assignee: Nippon Thompson Co., Ltd., Japan
[21] Appl. No.: 853,226
[22] Filed: Mar. 17, 1992
[30] Foreign Application Priority Data
Mar. 18, 1991 [JP] Japan .............................. 3-23862[U]
[51] Int. Cl.⁵ .............................................. F16C 29/04
[52] U.S. Cl. .................................................... 384/49
[58] Field of Search ....................... 384/49, 50, 55, 57, 384/59, 18, 19, 22, 23

[56] References Cited

U.S. PATENT DOCUMENTS 3,975,063 8/1976 Mahotka et al. ...................... 384/18
4,480,878 11/1984 Leiper ................................ 384/22 X
4,593,957 6/1986 Hidano ................................... 384/49

*Primary Examiner*—Thomas R. Hannon
*Attorney, Agent, or Firm*—Skjerven, Morrill, MacPherson, Franklin & Friel

[57] ABSTRACT

A linear motion guide unit of the finite type includes an elongated rail, a slider, a plurality of rolling members interposed between the rail and the slider, and a retainer for retaining the rolling members in position. The rail is provided with a plurality of mounting holes, at least one of which is located at a central portion of the rail. The slider is provided with at least one access hole which may be brought into alignment with a corresponding one of the mounting holes so that a bolt or any other tightening member can be inserted into the mounting hole through the access hole.

3 Claims, 10 Drawing Sheets

LINEAR MOTION ROLLING CONTACT GUIDE UNIT HAVING AN INCREASED FREEDOM IN MOUNTING

RELATED APPLICATION

This application relates to copending U.S. patent application Ser. No. 07/853,225 filed Mar. 17, 1992 and assigned to the assignee of this application.

BACKGROUND OF THE INVENTION

1. Field of the Invention

This invention generally relates to a linear motion rolling contact guide unit, and, in particular, to a finite linear motion rolling contact guide unit including a retainer for retaining a plurality of rolling members interposed between a rail and a slider.

2. Description of the Prior Art

A linear motion rolling contact guide unit is well known in the art and it generally includes a rail or base, a slider slidably mounted on the rail and a plurality of rolling members interposed between the rail and the slider. There are basically two types of such guide units. That is, one type of such guide units is of the endless linear motion type in which the slider may move along the rail as long as the rail exits; whereas, the other type is of the finite linear motion type in which the slider may move relative to and along the rail over a limited distance. In the case of the finite linear motion type, use is typically made of a retainer for retaining the rolling members in position between the rail and the slider.

One typical prior art finite linear motion guide unit is schematically shown in perspective view in FIG. 20. As shown, the illustrated finite linear motion guide unit includes a rail 22, which is elongated in shape and extends over a desired distance, and a slider or table 21 which is substantially equal in length in the longitudinal direction to the rail 22. The rail 22 is generally rectangular in shape in the illustrated structure and provided with a pair of left and right inner guide grooves 33 on its opposite side surfaces. The slider 21 is generally U-shaped in cross section and slidably mounted on the rail 22 in a straddling manner. The slider 21 is provided with a pair of left and right outer guide grooves 34 each located spaced apart from and facing opposite to a corresponding one of the pair of inner guide grooves 33. Thus, a guide channel is defined between each associated pair of inner and outer guide grooves 33 and 34, and a plurality of rolling members or rollers 23 in the illustrated example are provided in the guide channel. As a result, the rollers 23 are partly received in both of the associated inner and outer guide grooves 33 and 34 so that a rolling contact is provided between the rail 22 and the slider 21. In the illustrated example, the rollers 23 are arranged in the so-called crossed arrangement in which any two adjacent rollers 23 are arranged with their rotating axes directed perpendicular to each other when viewed into the direction of advancement.

As shown in FIG. 20, also provided is a retainer 24 in the form of an elongated plate for retaining the rollers 23 in position in the guide channel. In this structure, because of the provision of the retainer plate 24, the rollers 23 can be maintained at desired positions even if a relative motion is produced between the rail 22 and the slider 21 so that a uniform distribution of load may be maintained.

The outer guide groove 34 is defined in an elongated guide member 32 which is fixedly attached to each side wall section of the slider 21 by means of bolts 30 which are threaded into mounting holes 31. An end plate 26 is fixedly attached to each end of the rail 22 by means of screws 27 for blocking the inner guide groove 33 at each end so that the rollers 23 are prevented from slipping away.

In the linear motion guide unit of the above-described structure, a relative motion between the rail 22 and the slider 21 is rather limited. That is, there is a limit for the slider 21 to move to the right or to the left relative to the rail 22. Because of this limited range of relative movement between the slider 21 and the rail 22, there is a limitation in providing mounting holes 28 for use in mounting the rail 22 on a desired object, such as a frame of a machine, in the rail 22. In particular, in the case of the linear motion guide unit of the type shown in FIG. 20, such mounting holes 28 are only allowed to be provided at each end portion of the rail and not at the central portion because the central portion is not exposed even if the slider 21 is moved either to the leftmost or rightmost position relative to the rail 22.

This can be a significant disadvantage since even if the rail 22 is high in precision, an error in positioning or distortion can be created when the rail 1 is fixedly mounted on a desired object, such as a frame of a machine, by means of bolts or the like. That is, there is a chance that the linearity or planarity may be degraded when mounted on a desired object, for example, by bolt tightening. Besides, since the mounting holes 28 are provided only at each end portion of the rail 22, the manner of mounting the rail 22 is rather limited, which, in turn, could limit the scope of application of the guide unit shown in FIG. 20.

SUMMARY OF THE INVENTION

In accordance with the present invention, there is provided an improved linear motion guide unit including a rail, a slider slidably mounted on the rail, and a plurality of rolling members interposed between the rail and the slider, whereby at least one mounting hole is provided in a central portion of the rail and at least one through-hole is provided in the slider such that it can be located in registry with said mounting hole provided in the central portion of the rail.

In the preferred embodiment, such mounting holes are provided in the rail at a predetermined pitch. In this case, the rail may be mounted on a desired object uniformly when securely tightened, for example, by bolts.

It is therefor a primary object of the present invention to provide an improved linear motion rolling contact guide unit which does not produce any error or distortion when mounted on a desired object.

Another object of the present invention is to provide an improved linear motion rolling contact guide unit high in accuracy.

A still further object of the present invention is to provide an improved linear motion rolling guide unit having an increased degree of freedom in mounting.

Other objects, advantages and novel features of the present invention will become apparent from the following detailed description of the invention when considered in conjunction with the accompanying drawings.

DESCRIPTION OF THE PREFERRED EMBODIMENTS

Figure 1:
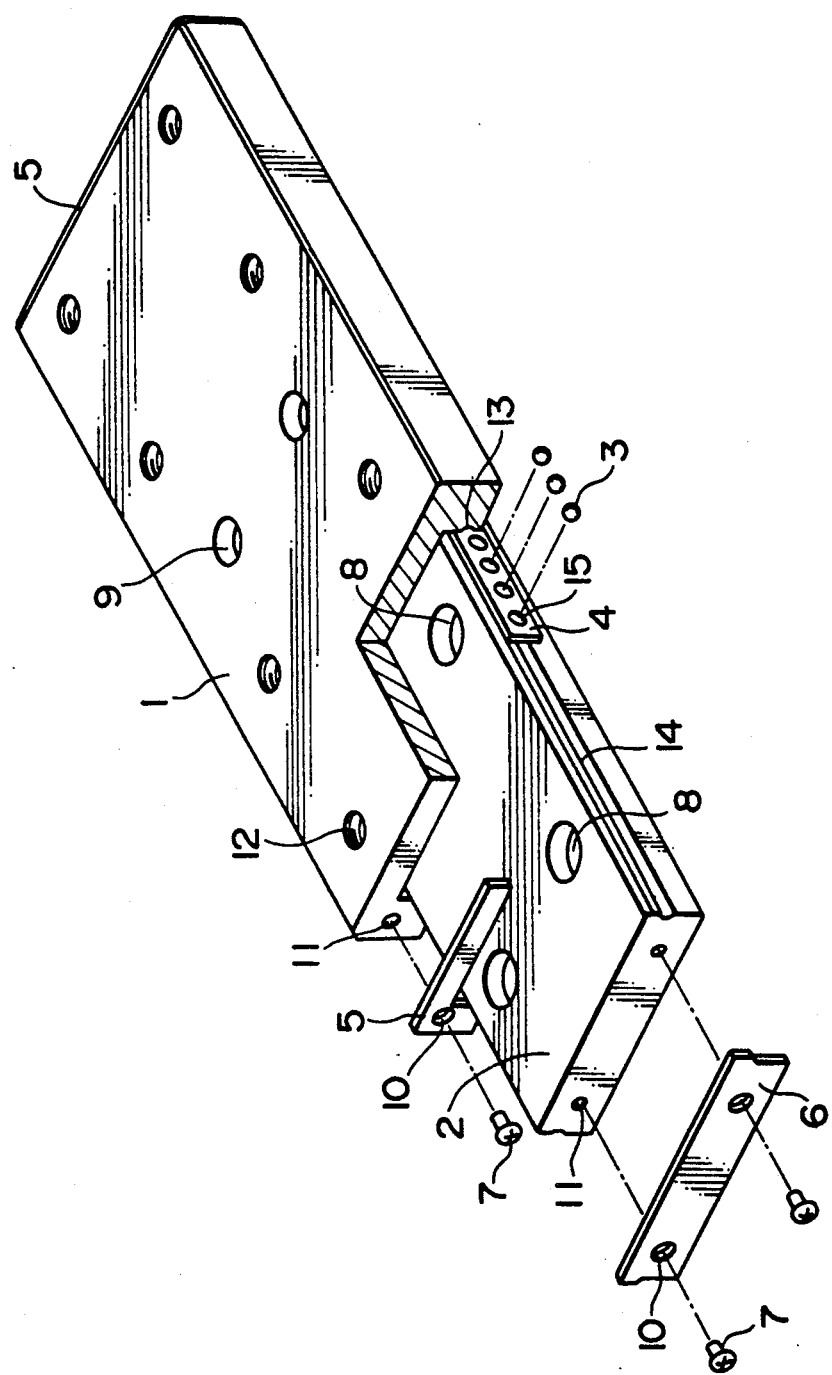
FIG. 1 is a schematic illustration showing in perspective view, partly cut-away and partly removed, a linear motion rolling contact guide unit constructed in accordance with one embodiment of the present invention.

Referring now to FIGS. 1 through 12, a linear motion rolling contact guide unit of the finite type constructed in accordance with one embodiment of the present invention will be described. As shown in FIGS. 1 through 4 and 9 through 12, the present linear motion rolling contact guide unit generally includes a bed or rail 2 which is elongated in shape and extends over a desired length, a table or slider 1 which is slidably mounted on the rail 2 in a straddling manner, a plurality of rolling members 3 interposed between the rail 2 and the slider 1 to provide a rolling contact therebetween and a retainer plate 4 also interposed between the rail 2 and the slider 1 for retaining the rolling members 3 in position. In the illustrated embodiment, use is made of balls for the rolling members 3; however, it is to be noted that the present invention should not be limited to such a specific application, and use may be made of any other types of rolling members, such as rollers in an aligned arrangement or crossed arrangement.

In the illustrated embodiment, the rail 2 is generally rectangular in cross section and it is provided with an inner guide groove 14 on each side surface thereof. The inner guide groove 14 extends in parallel with the longitudinal axis of the rail 2. On the other hand, the slider 1 has a generally U-shaped cross section and thus includes a horizontal section and a pair of vertical sections projecting downward from the opposite sides of the horizontal section. The slider 1 is also provided with an outer guide groove 13 at an inner side surface of each of the vertical sections located opposite to a corresponding one of the inner guide grooves 14 when assembled. Thus, when assembled, a guide channel is defined by a pair of associated inner and outer guide grooves 14 and 13 between the rail 2 and the slider 1.

A plurality of rolling members 3, or balls in the illustrated embodiment, are provided in each of the guide channels so that the balls 3 are partly received in each of the associated inner and outer guide grooves 14 and 13 to thereby provide a rolling contact between the rail 2 and the slider 1. Also provided in each of the guide channels is a retainer plate 4 which is elongated in shape and which serves to retain the balls 3 in position at all times. As shown in FIG. 1, the retainer plate 4 is provided with a plurality of openings or windows 15 each of which retains therein an associated one of the balls 3. The retainer plate 4 is preferably provided so as not to strongly engage with either of the rail 2 and the slider 1 since such a strong engagement would be a significant source of sliding resistance.

Figure 4:
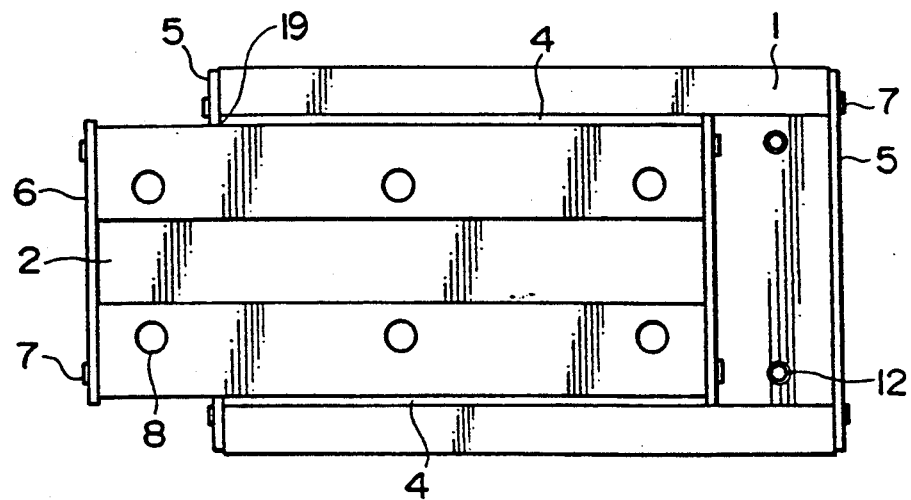
FIG. 4 is a schematic illustration showing in bottom view the guide unit of FIG. 1.
Figure 5:
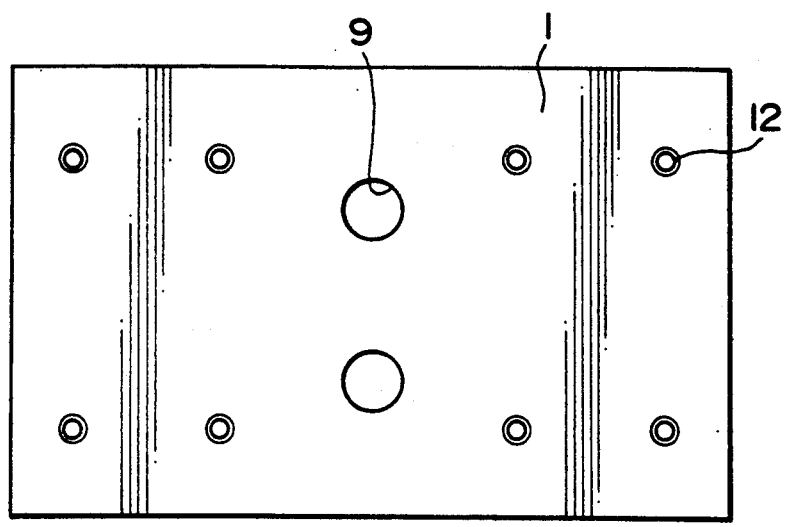
FIG. 5 is a schematic illustrating showing in plan view the slider or table employed in the guide unit of FIG. 1.
Figure 6:
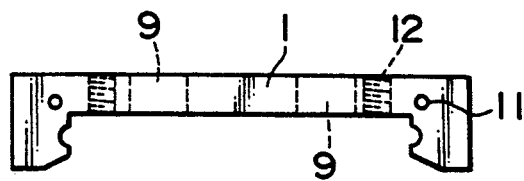
FIG. 6 is a schematic illustration showing in front view the slider shown in FIG. 5.
Figure 7:
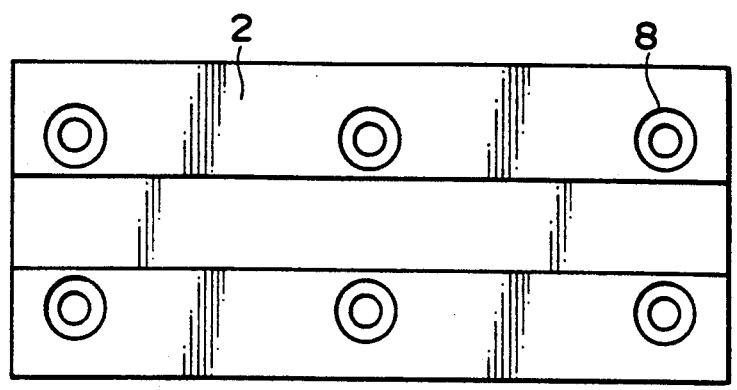
FIG. 7 is a schematic illustration showing in plan view the rail or bed employed in the guide unit of FIG. 1.
Figure 8:
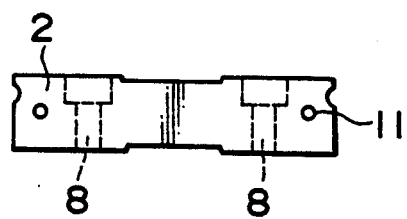
FIG. 8 is a schematic illustration showing in front view the rail shown in FIG. 7.

Also as best shown in FIG. 1, the slider table 1 is provided with a plurality of mounting holes 12 which are threaded and thus which may be used for attaching a desired object, such as a moving component of a machine, to the slider 1 fixedly by means of bolts or the like. The rail 2 is also provided with a plurality of mounting holes 8 which may also be threaded and which can be used for attaching the rail 2 to any desired object, such as a frame of the machine. Of importance, in accordance with the principle of the present invention, as best shown in FIGS. 4 and 7, the mounting holes 8 are provided not only in the end portions of the rail 2, but also in the central portion thereof. In addition, a pair of through-holes 9 is provided in the central portion of the slider 1 as access holes. These access holes 9 are provided in the slider 1 in a particular positional relationship with the mounting holes 8 provided in the central portion of the rail 2 so that an operator may have an access to each of the mounting holes 9 provided in the central portion of the rail 2 so as to insert bolts and have them tightened by an appropriate tool.

Figure 2:
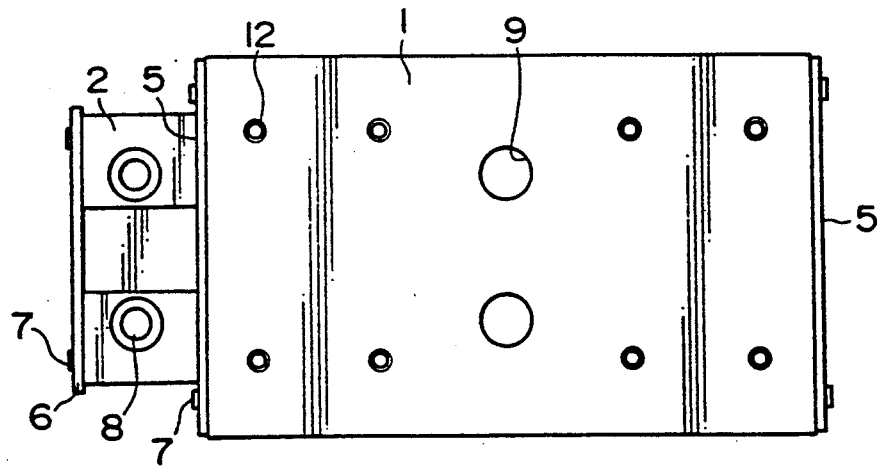
FIG. 2 is a schematic illustration showing in plan view the guide unit of FIG. 1.
Figure 3:
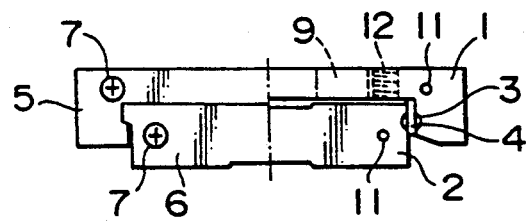
FIG. 3 is a schematic illustration showing in front view with the right half of each of its associated end plates removed the guide unit of FIG. 1.

In the illustrated embodiment, two rows of mounting holes 8 are provided in the rail 2 at a predetermined pitch, and two access holes 9 are provided at the center of the slider 2 in the same spaced apart relation in the transverse direction as that of the mounting holes 8 in the rail 2. Thus, when the slider 2 is located at its home position, the access holes 9 come to be aligned with the respective center mounting holes 8 of the rail 2. On the other hand, if the slider 1 is located at its leftmost position as shown in FIGS. 2 and 4, the mounting holes 8 in the left end portion of the rail 2 become exposed, so that the bolts or the like may be inserted into the respective mounting holes 8. The other mounting holes 8 in the right end portion of the rail 2 may also be exposed when the slider 1 is located at its leftmost position. In the illustrated embodiment, additional mounting holes 8 may be provided somewhere inbetween those which are indicated in FIGS. 4 and 7, in which case those additional mounting holes may be so arranged to be exposed by the access holes 9 of the slider 1. It should also be noted that one or more additional access holes 9 can be provided in the slider 1 so as to allow access to selected mounting holes 8 of the rail 2.

Figure 11:
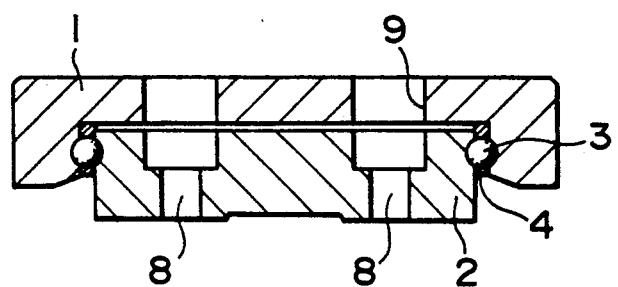
FIG. 11 is a schematic illustration showing the guide unit of FIG. 1 in cross section taken along line A—A indicated in FIG. 9.
Figure 12:
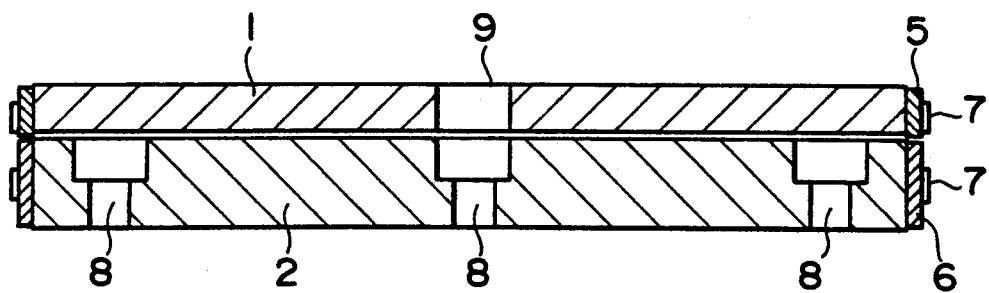
FIG. 12 is a schematic illustration showing the guide unit of FIG. 1 in cross section taken along line B—B indicated in FIG. 9.

As described above, since the access holes 9 are provided in the slider 1, mounting holes 8 may be provided at any desired location, including a central portion, of the rail 2, so that the mounting holes 8 may be provided at an equal pitch, if desired. Such a structure is particular important when the rail 2 is relatively long, since the rail 2 can be fixedly mounted on a desired object without error or distortion. The positional alignment between the mounting holes 8 of the rail 2 and the access holes 9 of the slider 1 is best shown in FIGS. 11 and 12. As shown in FIG. 12, when the slider 1 is located at its home position, the access holes 9 are aligned with respective center mounting holes 8 so that bolts may be inserted into the mounting holes 8 through the access holes 9 and tightened.

The present linear motion guide unit is also provided with a slider end plate 5 which is fixedly attached to each end surface thereof by means of screws 7 which in turn pass through respective holes 10 of the slider end plate and are threaded into threaded holes 11 provided at the end surface of the slider 1. Similarly, the rail 2 is also provided with a rail end plate 6 which is fixedly attached to each end surface thereof by means of screws 7 which in turn pass through respective holes 10 of the rail end plate 6 and are threaded into threaded holes 11 provided at the end surface of the rail 2. Each of the end plates 5 and 6 has a particular shape defined according to the principle of the invention as described and reclaimed in the copending U.S. patent application filed together with this application and assigned to the assignee of this application.

Figure 9:
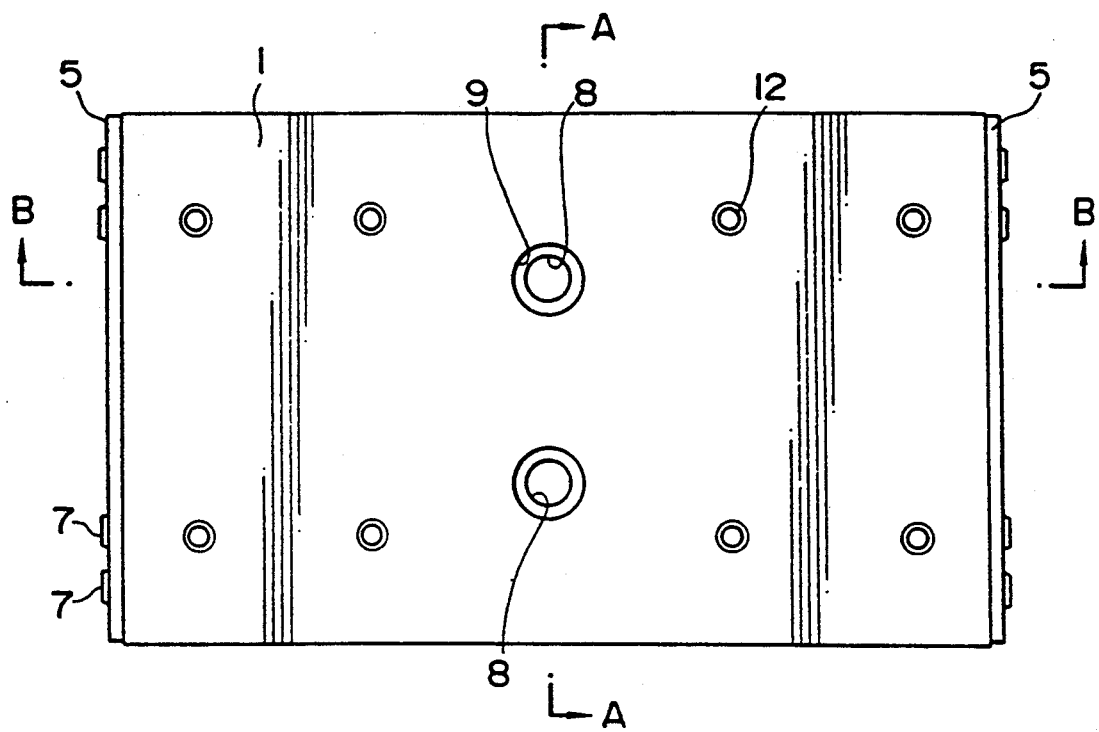
FIG. 9 is a schematic illustration showing in plan view the guide unit of FIG. 1 when the slider 1 is located at its home position.
Figure 10:
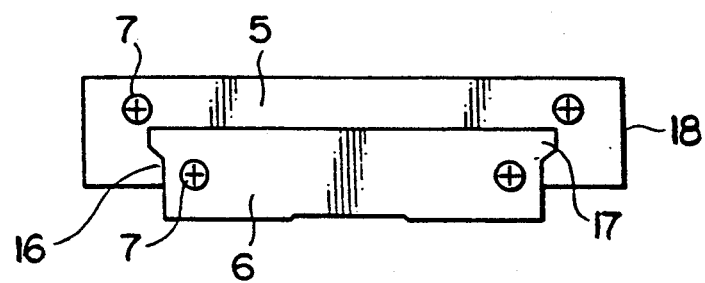
FIG. 10 is a schematic illustration showing in front view the guide unit of FIG. 1.

That is, as described in the copending U.S. application, in the specific embodiment shown in FIGS. 1 through 12, as shown in FIG. 10, the rail end plate 6 is generally rectangular in shape, but it is provided with an outwardly extending projection 17 approximately at the upper half of each side edge. As a result, the rail end plate 6 is generally in the shape of "T." The outward side projection 17 is so sized that it extends across the gap between the side surfaces of the rail 2 and the slider 1 as much as possible, but it does not extend excessively to interfere with the slider 1. Thus, the outward side projection 17 may serve as an effective stopper against the retainer plate 4 since the retainer plate 4 may be arrested securely with its end surface coming into contact with the outward side projection 17. In the structure shown in FIG. 10, the outward side projection 17 has a slanted side so as to avoid the creation of any stress concentration since the retainer plate 4 can impinge upon the outward side projection 17 under some applications.

On the other hand, FIG. 10 illustrates the slider end plate 5 which includes a horizontal section and a pair of vertical sections 18 extending downward from the opposite ends of the horizontal section generally in conformance with the cross sectional shape of the slider 1. However, the slider end plate 5 is also provided with an inwardly extending projection 16 which extends inwardly from the inner side of each of the vertical sections approximately at its bottom half. As a result, the slider end plate 5 may be said to be generally in the shape of "C." It is to be noted that the distance between the vertical side sections 18 of the slider end plate 5 is selected to allow the associated rail end plate 6 to be fitted therein with a predetermined clearance therebetween. Thus, the rail end plate 6 may be fitted into the space defined by the slider end plate 5 similar to the jigsaw puzzle and yet without contact therebetween. The inward projection 16 is so sized to extend substantially across the gap between the side surfaces of the rail 2 and the slider 1 so as to allow to securely arrest the retainer plate 4, thereby serving as an effective stopper. However, the inward projection 16 should not extend excessively to engage with the rail 2 itself. The inward projection 16 also has a slant side edge and this structure is advantageous since it can avoid the creation of stress concentration as much as possible. Preferably, as best shown in FIG. 10, the outward and inward projections 17 and 16 are complementary in shape at least partly. In the illustrated embodiment, since the outward and inward projections 17 and 16 are complementary in shape with a predetermined clearance therebetween, each of the projections 17 and 16 can provide the largest possible contact or stopper surface against the end surface 19 (FIG. 4) of the retainer plate 4. Besides, these complementary projections 17 and 16 also can serve as a shield cover when they are aligned for example at the home position.

In the embodiment shown in FIGS. 1 through 12, the rail 2 and the slider 1 are substantially equal in length in the longitudinal direction. FIGS. 2 and 4 illustrate one limit condition in which the slider 1 has moved to the rightmost position relative to the rail 2. Under the condition, the left-hand end surface of the retainer plate 4 is arrested by or in abutment against the left-hand slider end plate 5 and the right-hand end surface of the retainer plate 4 is arrested by or in abutment against the right-hand rail end plate 6. Thus, the slider 1 is halted at its rightmost location relative to the rail 2.

On the other hand, FIG. 9 illustrates the condition when the slider 1 is located at its home position so that the slider end plate 5 is aligned with the rail end plate 6 at each end. In the illustrated embodiment, since the slider and rail end plates 5 and 6 are substantially complementary in shape along their mating edges, the gap between the slider 1 and the rail 2 may be closed substantially, thereby preventing any undesired foreign matter coming into the gap between the slider 1 and the rail 2. It is to be noted, however, that a predetermined clearance is set between the opposite edges of the associated slider and rail end plates 5 and 6 so that these end plates 5 and 6 are prevented from coming into engagement during operation.

Figure 13:
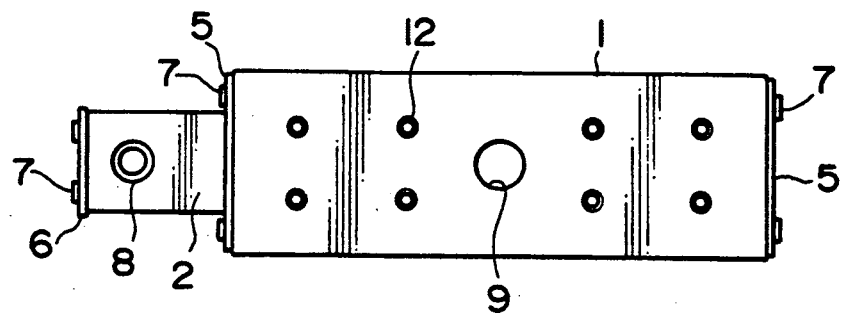
FIG. 13 is a schematic illustration showing in plan view a linear motion guide unit constructed in accordance with another embodiment of the present invention.
Figure 14:
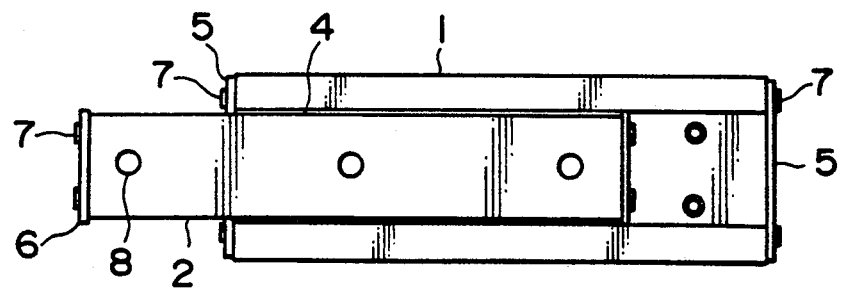
FIG. 14 is a schematic illustration showing in bottom view the guide unit shown in FIG. 13.
Figure 15:
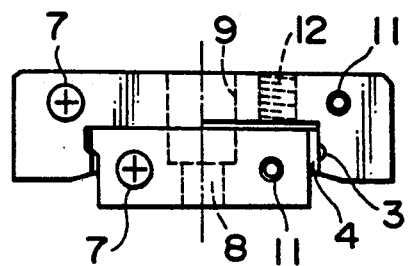
FIG. 15 is a schematic illustration showing in front view on a somewhat enlarged scale the guide unit of FIG. 13 with its right-hand half removed.

FIGS. 13 through 15 show a linear motion rolling contact guide unit of the finite type constructed in accordance with another embodiment of the present invention, which is smaller in size as compared with the previously described embodiment. The present embodiment is substantially same in structure and function in many respects as the previously described embodiment. FIGS. 13 and 14 shows a stroke limit condition in which the slider 1 is located at its rightmost location relative to the rail 2 with its retainer plate 4 in abutment against the left-hand end plate 5 of the slider 1 and also against the right-hand end plate 6 of the rail 2. In this embodiment, a single access hole 9 is provided in the slider 1 at its center, and three mounting holes 8 are provided in the rail 2 in a line spaced apart from each other. In this embodiment also, the mounting holes 8 at each end portion of the rail 2 can be exposed by moving the slider 1 to its extreme location at its right or left, however the mounting hole 8 at the center of the rail 2 cannot be exposed because the relative movement between the slider 1 and the rail 2 is limited. However, since the access hole 9 is provided in the slider, the access hole 9 can be brought into alignment with the mounting hole 8 at the center of the rail 2 when the slider 1 is located at its center or home position. Thus, an access can also be obtained for the center mounting hole 8.

Figure 16:
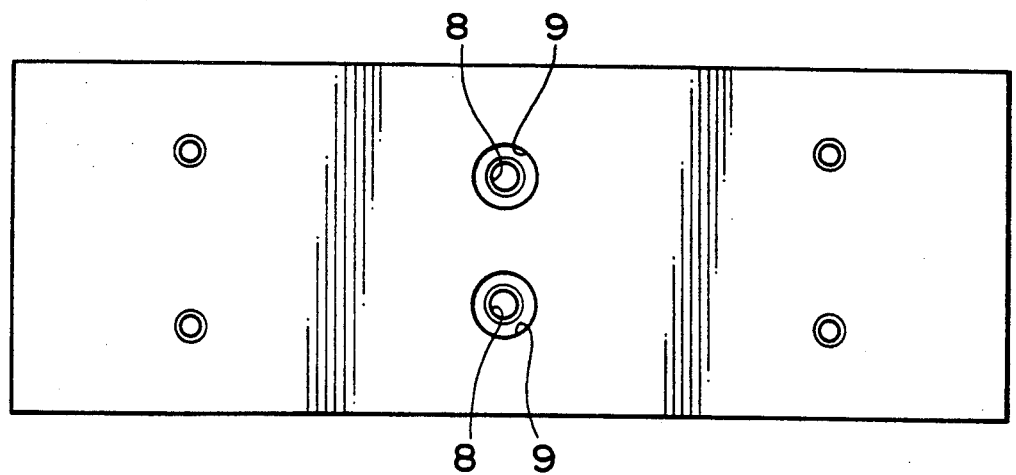
FIG. 16 is a schematic illustration showing in plan view a linear motion rolling contact guide unit constructed in accordance with a further embodiment of the present invention.
Figure 17:
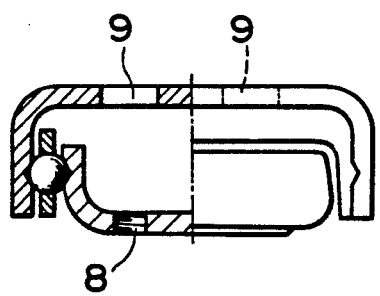
FIG. 17 is a schematic illustration showing in front view the guide unit of FIG. 16 with its left-hand half section shown in cross section.

FIGS. 16 and 17 illustrate a linear motion rolling contact guide unit constructed in accordance with a further embodiment of the present invention. In this embodiment, two rows of mounting holes 8 are provided in the rail 2 and thus two access holes 9, each aligned in position with each of the rows, are provided in the slider 1. In this embodiment, the rail 8 is not rectangular in shape, but instead it is made from a thin metal plate bent in the shape of "U."

Figure 18:
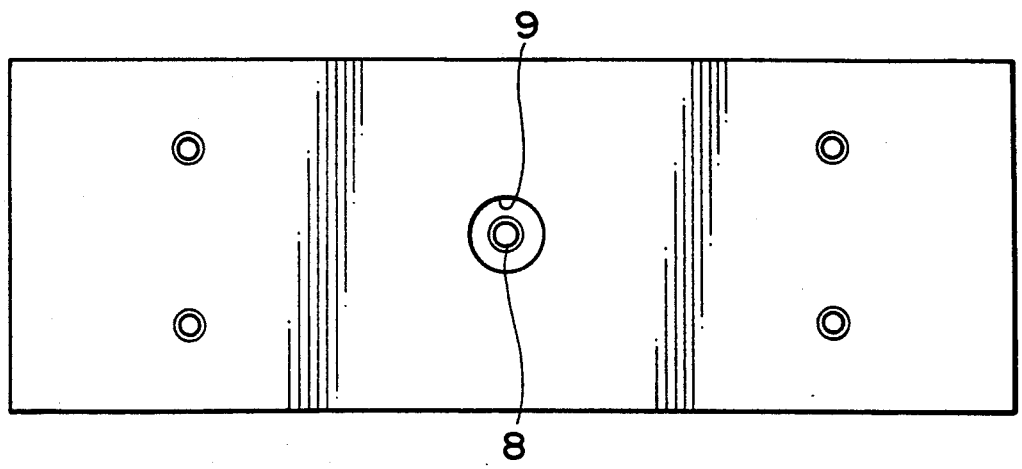
FIG. 18 is a schematic illustration showing in plan view a linear motion rolling contact guide unit constructed in accordance with a still further embodiment of the present invention.
Figure 19:
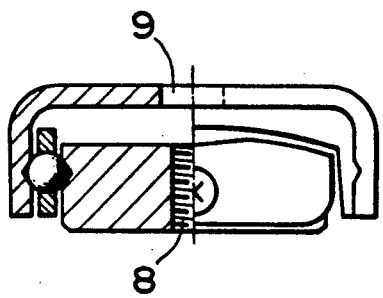
FIG. 19 is a schematic illustration showing in front view the guide unit of FIG. 18 with its left-hand half section shown in cross section.
Figure 20:
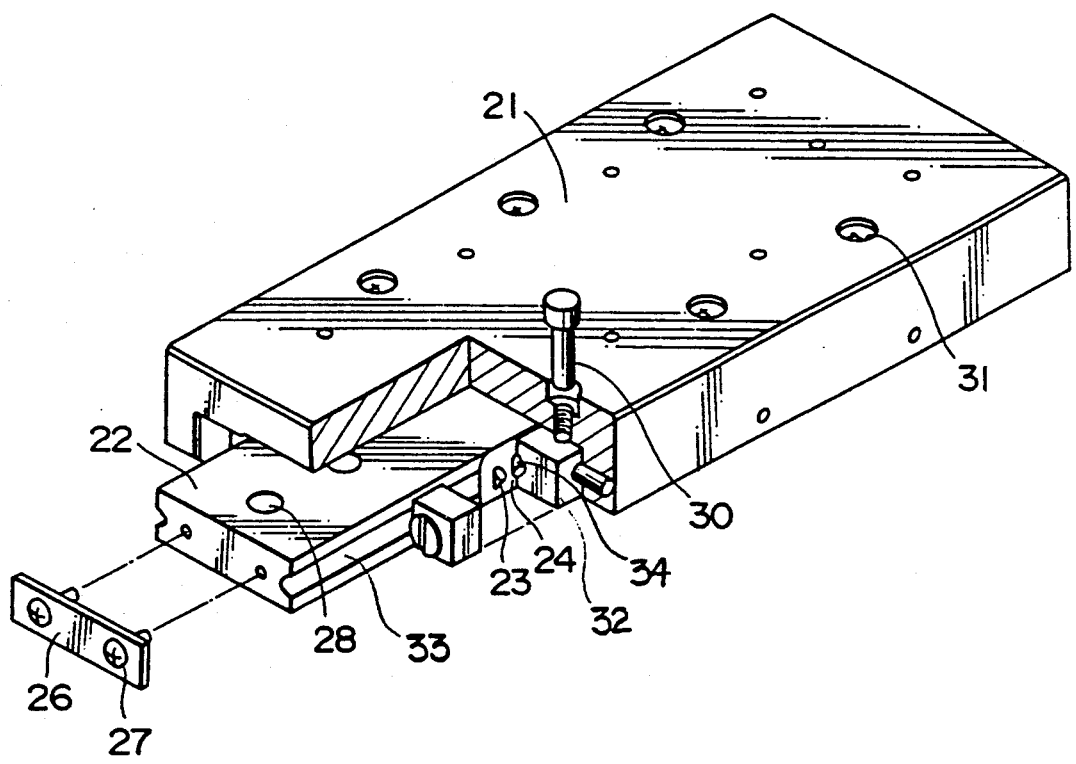
FIG. 20 is a schematic illustration showing in partly removed, perspective view a typical prior art linear motion rolling contact guide unit of the finite type.

FIGS. 18 and 19 illustrate a linear motion rolling contact guide unit constructed in accordance with a still further embodiment of the present invention. In this embodiment, a plurality of mounting holes 8 are provided in the rail 2 in a row along its center longitudinal axis, and a single access hole 9 is provided at the center of the slider 1. In this manner, one or more mounting holes 8 may be provided at any desired location of the rail 2 and one or more access holes 9 may be provided in the slider such that the access holes 9 may be brought into alignment with the selected ones of the mounting holes 8 even if these mounting holes 8 cannot be exposed by a relative motion between the rail 2 and the slider 1.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A linear motion rolling contact guide unit, comprising:
    a rail extending over a length along a longitudinal axis of said unit and provided with first guiding means extending in parallel with said longitudinal axis;
    a slider slidably mounted on said rail in a straddling manner and provided with second guiding means located opposite to said first guiding means to thereby define a guide channel when assembled;
    a plurality of rolling members provided in said guide channel to thereby provide a sliding contact between said rail and said slider;
    a retainer plate provided in said guide channel for retaining said plurality of rolling members in position;
    whereby at least one mounting hole is provided in a central portion of said rail, which portion cannot be exposed due to a relative motion between said rail and said slider, for mounting said rail on a desired object separate from said guide unit and at least one access hole is provided in said slider such that said at least one access hole may be brought into alignment with said at least one mounting hole when said slider and said rail are brought into alignment.

2. The guide unit of claim 1, wherein said rail and said slider are substantially same in length.

3. The guide unit of claim 1, wherein a plurality of said mounting holes are provided in said rail substantially at an equal pitch in a direction parallel to said longitudinal axis.

* * * * *